(12) United States Patent
Hosono

(10) Patent No.: US 8,509,151 B2
(45) Date of Patent: Aug. 13, 2013

(54) MOBILE COMMUNICATION METHOD, MOBILE COMMUNICATION SYSTEM, AND INFORMATION TRANSFER DEVICE

(75) Inventor: Hiroyuki Hosono, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 246 days.

(21) Appl. No.: 12/996,253

(22) PCT Filed: Jun. 4, 2009

(86) PCT No.: PCT/JP2009/060267
§ 371 (c)(1),
(2), (4) Date: Mar. 9, 2011

(87) PCT Pub. No.: WO2009/148126
PCT Pub. Date: Dec. 10, 2009

(65) Prior Publication Data
US 2011/0149862 A1    Jun. 23, 2011

(30) Foreign Application Priority Data
Jun. 4, 2008    (JP) ................................. 2008-147472

(51) Int. Cl.
*H04W 4/00*    (2009.01)
(52) U.S. Cl.
USPC ........... 370/328; 370/338; 370/401; 455/524; 455/456.1
(58) Field of Classification Search
USPC .......................................... 370/328, 338, 401
See application file for complete search history.

(56) References Cited

U.S. PATENT DOCUMENTS

| 6,366,789 B1 * | 4/2002 | Hildebrand .................... 455/561 |
| 6,729,929 B1 * | 5/2004 | Sayers et al. .................. 455/446 |
| 7,075,912 B2 | 7/2006 | Suda et al. |

(Continued)

FOREIGN PATENT DOCUMENTS

| JP | 2003 249944 | 9/2003 |
| JP | 2007 228383 | 9/2007 |
| JP | 2008 22524 | 1/2008 |

OTHER PUBLICATIONS

"3 GPP TSG RAN #35 RP-070209, Requirements for LTE Home eNodeBs", Orange, Telecom Italia, T-Mobile, Vodafone, Agenda Item: 10.19, Discussion & Decision, Total p. 4, (Mar. 6-9, 2007).

(Continued)

*Primary Examiner* — Ricky Ngo
*Assistant Examiner* — Dewanda Samuel
(74) *Attorney, Agent, or Firm* — Oblon, Spivak, McClelland, Maier & Neustadt, L.L.P.

(57) ABSTRACT

A mobile communication method according to the present invention includes step of notifying an information transfer device 501 of identification information on a radio base station 201 by a network device 100, the information transfer device 501 corresponding to an inputted installation location of the radio base station 201, step of managing, by the information transfer device 501, the notified identification information on the radio base station 201, step of transmitting, when the radio base station 201 is installed or moved, an installation signal from the radio base station 201 to an information transfer device 501 to which the radio base station is connected, step of transferring the installation signal to the network device 100 by the information transfer device 501 to which the radio base station 201 is connected, if the information transfer device 501 manages the identification information on the radio base station 201 included in the received installation signal.

3 Claims, 5 Drawing Sheets

(56) References Cited

U.S. PATENT DOCUMENTS

| | | | |
|---|---|---|---|
| 7,486,635 B2 * | 2/2009 | Okanoue et al. | 370/328 |
| 7,808,946 B2 * | 10/2010 | Claussen et al. | 370/328 |
| 8,014,776 B2 * | 9/2011 | Nylander et al. | 455/435.2 |
| 8,145,255 B2 * | 3/2012 | Rekimoto | 455/524 |
| 8,184,647 B2 * | 5/2012 | Gupta et al. | 370/401 |
| 2010/0075698 A1 * | 3/2010 | Rune et al. | 455/458 |

OTHER PUBLICATIONS

International Search Report issued Aug. 18, 2009 in PCT/JP09/060267 filed Jun. 4, 2009.

* cited by examiner

FIG. 4

| INFORMATION TRANSFER DEVICE ID | RADIO BASE STATION ID |
|---|---|
| 501 | 201 |
| 502 | 202 |
| ⋮ | ⋮ |

MOBILE COMMUNICATION METHOD, MOBILE COMMUNICATION SYSTEM, AND INFORMATION TRANSFER DEVICE

TECHNICAL FIELD

The present invention relates to a mobile communication method, a mobile communication system and an information transfer device.

BACKGROUND ART

In a mobile communication system, a radio base station for public communications is generally configured to be operated and managed constantly by a network operator after start of its operation. This configuration allows the radio base station for public communications to respond to randomly transmitted connection requests from mobile stations.

For example, a network administrator starts operation of a radio base station for public communications in the following manner.

(1) Install a radio base station for public communications, connect lines and so forth, and then turn on the radio base station to thereby open a line between itself and a host node (such as a radio control device).

(2) Set operation parameters to be used in the radio base station for public communications, via a network or by manual input.

After the operation is started with the settings of the parameters reflected therein, the radio base station for public communications continuously provides a communication service with the least disconnection except for a case where the radio base station needs to be restarted due to a failure, a change in the device configuration, or the like.

In a case of removing such a radio base station for public communications, the radio base station for public communications is caused to stop the provision of the communication service and is then turned off.

Note that basically the same operation as the radio base station for public communications is likely to be carried out for a radio base station installed to a small area such as a home, which is referred to as a "home radio base station (Home eNB)."

SUMMARY OF THE INVENTION

However, a home radio base station is assumed to be purchased and installed by a user himself/herself. Since the user carries out the procedures (1) and (2), it may become impossible to precisely manage information on a position where the home radio base station is installed (installation location).

Moreover, even if an installation location of the home radio base station is once correctly registered to a mobile communication network, the home radio base station may be relocated at the user's convenience. For this reason, there is need for a structure which detects moving of home radio base stations, so that only home radio base stations whose installation locations are registered normally are operated in a mobile communication network.

As such a structure, assumed is a method in which a mobile communication network acquires, as an installation location, location information acquired by a GPS function implemented on the home radio base station.

Although this structure allows the mobile communication network to always acquire the installation location of the home radio base station, the home radio base station needs to implement the GPS function, which would cause a problem of increased cost of the home radio base station.

In addition, since the GPS function requires reception of radio waves from multiple satellites, the GPS function may not work in the home radio base station which is often installed indoors.

Hence, the present invention has been made in view of the above problems, and has an objective to provide a mobile communication method, a mobile communication system and an information transfer device which enable detection of unauthorized moving of a home radio base station of which a mobile telecommunications operator is not notified, without causing the home radio base station to implement a GPS function.

The first feature of the present invention is summarized in that a mobile communication method including step A of notifying an information transfer device of identification information on a radio base station by a network device, the information transfer device corresponding to an inputted installation location of the radio base station; step B of managing, by the information transfer device, the notified identification information on the radio base station; step C of transmitting, when the radio base station is installed or moved, an installation signal from the radio base station to an information transfer device to which the radio base station is connected; step D of transferring the installation signal to the network device by the information transfer device to which the radio base station is connected, if the information transfer device manages the identification information on the radio base station included in the received installation signal; and step E of discarding the installation signal without transferring the installation signal to the network device by the information transfer device to which the radio base station is connected, if the information transfer device does not manage the identification information on the radio base station included in the received installation signal.

In the first feature of the present invention, in the step E, the information transfer device to which the radio base station is connected may instruct the radio base station to notify the network device of an installation location of the radio base station, if the information transfer device does not manage the identification information on the radio base station included in the received installation signal.

The second feature of the present invention is summarized in that a mobile communication system including a network device and a plurality of information transfer devices, wherein the network device is configured to notify one of the information transfer devices of identification information on a radio base station, the one information transfer device corresponding to an inputted installation location of the radio base station, each of the information transfer devices is configured to manage the notified identification information on the radio base station, in a case where the radio base station transmits, at the time of installation or moving, an installation signal to an information transfer device to which the radio base station is connected, the information transfer device to which the radio base station is connected is configured to transfer the installation signal to the network device if the identification information on the radio base station included in the received installation signal is managed by the information transfer device, and in a case where the radio base station transmits, at the time of installation or moving, an installation signal to an information transfer device to which the radio base station is connected, the information transfer device to which the radio base station is connected is configured to discard the installation signal without transferring the installation signal to the network device if the identification information on the radio base station included in the received installation signal is not managed by the information transfer device.

In the second feature of the present invention, the information transfer device to which the radio base station is connected may instruct the radio base station to notify the network device of an installation location of the radio base station, if the information transfer device does not manage the identification information on the radio base station included in the received installation signal.

The third feature of the present invention is summarized in that an information transfer device connected to a network device including a managing unit configured to manage identification information on a radio base station notified by the network device, and a transfer unit configured to transfer, to the network device, an installation signal transmitted by a radio base station at the time of installation or moving, if the identification information on the radio base station included in the installation signal is managed, wherein the transfer unit is configured to discard an installation signal transmitted by the radio base station at the time of installation or moving, without transferring the installation signal to the network device, if identification information on a radio base station included in the installation signal is not managed.

In the third feature of the present invention, the transfer unit may instruct the radio base station to notify the network device of an installation location of the radio base station if the identification information on the radio base station included in the installation signal is not managed.

As described above, according to the present invention, it is possible to provide a mobile communication method, a mobile communication system and an information transfer device which enable detection of unauthorized moving of a home radio base station of which a mobile telecommunications operator is not notified, without causing the home radio base station to implement a GPS function.

BRIEF DESCRIPTION OF THE DRAWINGS

FIG. 4 is a diagram showing an example of radio base station information managed by the network device according to the first embodiment of the present invention.

MODES FOR CARRYING OUT THE INVENTION

Configuration of Mobile Communication System According to First Embodiment of Present Invention A description will be given of a configuration of a mobile communication system according to a first embodiment of the present invention with reference to FIG. 1 through FIG. 4.

Figure 1:
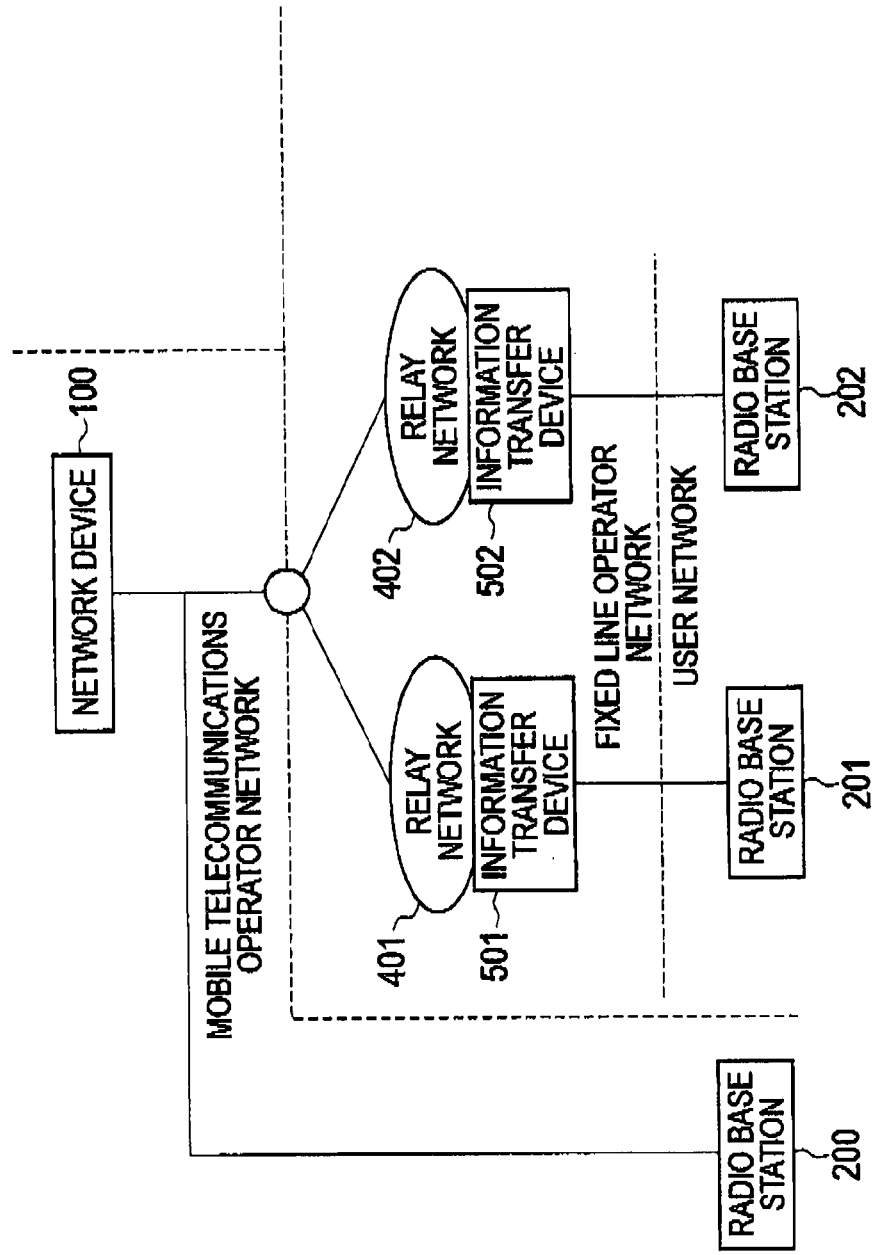
FIG. 1 is an overall configuration diagram of a mobile communication system according to a first embodiment of the present invention.

As shown in FIG. 1, the mobile communication system according to the embodiment includes a network device 100, information transfer devices 501, 502 connected to relay networks 401, 402, respectively, and radio base stations 200 to 202.

Note that the radio base station 200 is a radio base station for public communications installed in a mobile telecommunications operator network which is managed by a network administrator (mobile telecommunications operator). Meanwhile, the radio base stations 201 and 202 are home radio base stations managed by a user subscribing to a communication service provided by the network administrator (mobile telecommunications operator), and may be moved by the user.

For example, the radio base stations 201 and 202 may be installed in a user network (LAN: local area network) managed by the user, and connect to the network device 100 in the mobile telecommunications operator network via an FTTH or ADSL-access operator network.

Figure 2:
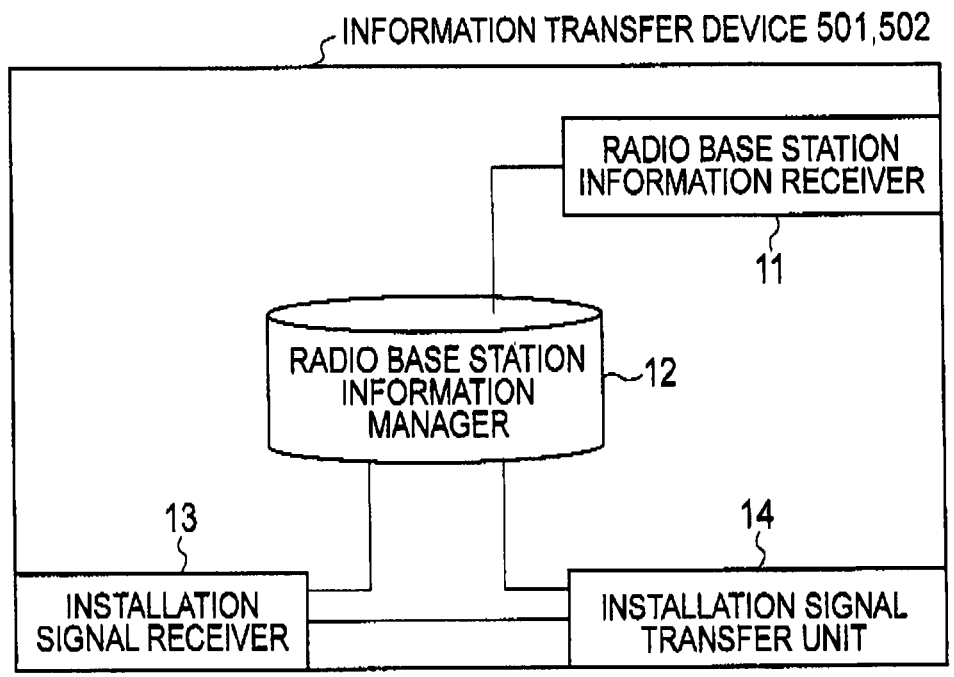
FIG. 2 is a functional block diagram of an information transfer device according to the first embodiment of the present invention.

As shown in FIG. 2, the information transfer devices 501 and 502 include a radio base station information receiver 11, a radio base station information manager 12, an installation signal receiver 13 and an installation signal transfer unit 14.

The radio base station information receiver 11 is configured to receive from the network device 100 radio base station information including identification information on radio base stations which should be controlled under the information transfer devices 501 and 502. Here, the identification information on the radio base station may be a radio base station ID, or a user ID of an owner of the radio base station.

The radio base station information manager 12 is configured to manage radio base station information received by the radio base station information receiver 11. The radio identification information may include information other than the identification information on the radio base station, such as information on a position where the radio base station is installed (installation location).

The installation signal receiver 13 is configured to receive an installation signal transmitted from the radio base station 201 or 202 when the radio base station 201 or 202 is installed or moved. Such an installation signal includes the above-mentioned identification information on the radio base station.

The installation signal transfer unit 14 is configured to refer to the radio base station information manager 12, and if radio base station information including the identification information on the radio base station which is included in the installation signal received by the installation signal receiver 13 is managed, transfer the installation signal to the network device 100.

In addition, the installation signal transfer unit 14 is configured to refer to the radio base station information manager 12, and if the radio base station information including the identification information on the radio base station which is included in the installation signal received by the installation signal receiver 13 is not managed, discard the installation signal without transferring it to the network device 100.

Note that the installation signal transfer unit 14 may refer to the radio base station information manager 12, and instruct the radio base station 201 or 202 (or a specified terminal) to notify the network device 100 of an installation location of the radio base station 201 or 202 if the radio base station information including the identification information on the radio base station which is included in the installation signal received by the installation signal receiver 13 is not managed.

In addition, the information transfer devices 501 and 502 are configured to transfer data not only to the mobile telecommunications operator network but also to an ISP (Internet service provider) operator network, for example.

Figure 3:
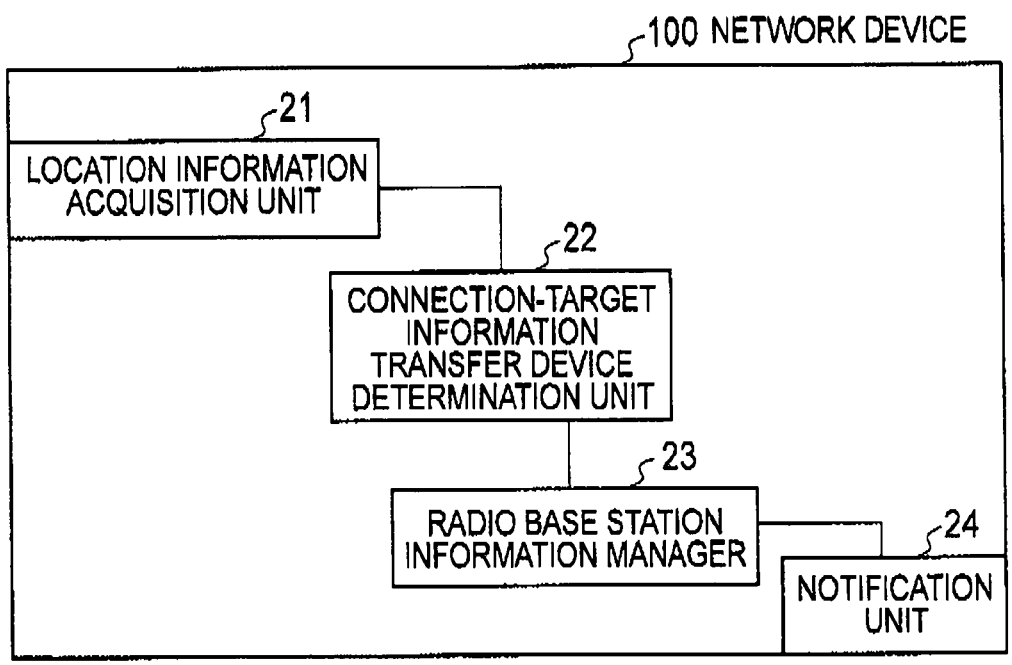
FIG. 3 is a functional block diagram of a network device according to the first embodiment of the present invention.

As shown in FIG. 3, the network device 100 (such as a radio control device) includes a location information acquisition unit 21, a connection-target information transfer device determination unit 22, a radio base station information manager 23 and a notification unit 24.

The location information acquisition unit 21 is configured to acquire an installation location (location information) of the radio base station 201 or 202, which is designated by a purchaser of the radio base station 201 or 202.

Here, the installation location (location information) of the radio base station 201 or 202 designated by the purchaser of the radio base station 201 or 202 may be inputted by a staff or the like at a distributor of the radio base station 201 or 202.

The connection-target information transfer device determination unit 22 is configured to determine, in accordance with an inputted installation location of a radio base station, an information transfer device in which the radio base station should be accommodated (connected).

For example, the information transfer device 501 or 502 is installed city by city, and the connection-target information transfer device determination unit 22 may determine that the radio base station 201 installed in city A should be accommodated in the information transfer device 501, and the radio base station 202 installed in city B should be accommodated in the information transfer device 502.

The radio base station information manager 23 is configured to store an "information transfer device ID" and a "radio base station ID" in association with each other as shown in FIG. 4.

Here, the "information transfer device ID" is identification information on an information transfer device in which a radio base station identified by the "radio base station ID" should be accommodated (connected), and the "radio base station ID" is identification information on a radio base station.

Specifically, the radio base station information manager 23 is configured to store identification information on the information transfer device determined by the connection-target information transfer device determination unit 22 in association with identification information on the radio base station.

In addition, the radio base station information manager 23 may manage not only the "information transfer device ID" and the "radio base station ID," but also operation parameters or the like of each radio base station.

Note that while the mobile telecommunications operator can set an installation location of the radio base station 200 at every installation of the radio base station 200, a user installs the radio base stations 201 and 202, and thus when changing the installation location of the radio base stations 201 and 202, the user is required to notify the mobile telecommunications operator of that fact.

The notification unit 24 is configured to notify an information transfer device corresponding to an inputted installation location of a radio base station, of identification information on the radio base station.

(Operation of Mobile Communication System According to First Embodiment of Present Invention)

Figure 5:
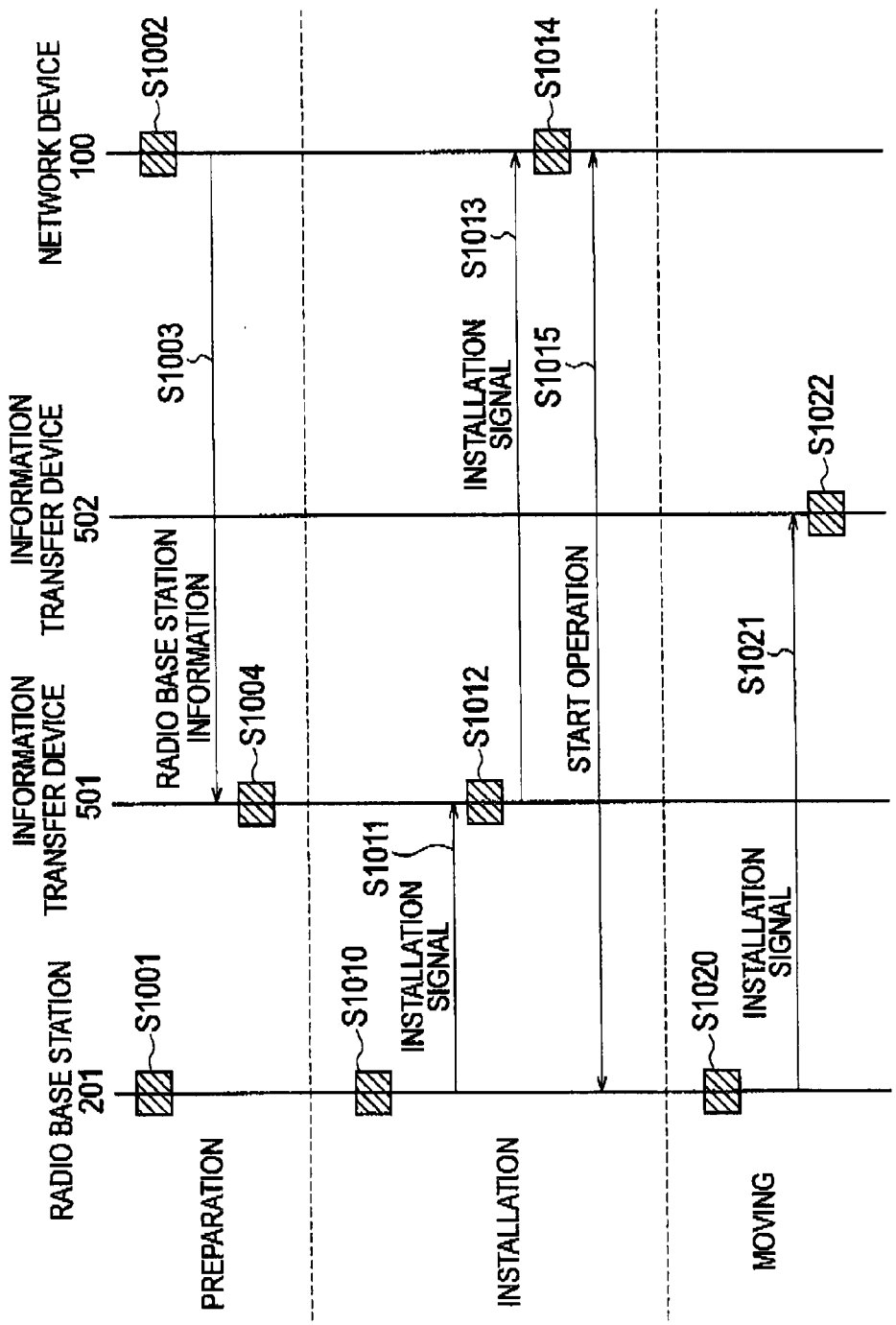
FIG. 5 is a sequence diagram showing an operation of the mobile communication system according to the first embodiment of the present invention.

Referring to FIG. 5, a description will be given of an operation of the mobile communication system according to the first embodiment of the present invention, that is, an operation carried out between installation and moving of the radio base station 201.

As shown in FIG. 5, in step S1001, a user purchases the radio base station 201 which is a home radio base station. Here, when the user subscribes to a service at a distributor or the like of the mobile telecommunications operator, an installation location of the radio base station 201, the relay network 401 that accommodates the radio base station 201 according to the installation location, identification information (such as a user ID) on the radio base station 201 and the like are set for the radio base station 201. At this time, the identification information on the radio base station 201 is assumed to be unique to the radio base station 201 in the entire relay network.

In step S1002, the user performs the same settings for the network device 100, the settings being related to the identification information on the radio base station 201, the installation location of the radio base station 201, and the like.

In step S1003, the network device 100 transmits, to the information transfer device 501 corresponding to the installation location of the set (inputted) radio base station 201, radio base station information including identification information on the radio base station 201.

In step S1004, the information transfer device 501 manages the received radio base station information including the identification information on the radio base station 201.

When the radio base station 201 is installed in step S1010, the radio base station 201 in step S1011 transmits an installation signal including identification information on the radio base station 201, to the information transfer device 501 to which the radio base station 201 is connected.

In step S1012, the information transfer device 501 refers to the radio base station information manager 12 and determines whether or not the identification information on the radio base station 201 included in the received installation signal is managed.

If it is determined that the identification information on the radio base station 201 is managed, the information transfer device 501 transfers the installation signal to the network device 100 in step S1013.

In step S1014, upon receipt of the installation signal transferred by the information transfer device 501 via the relay network 401, the network device 100 refers to the radio base station information manager 23 to confirm that the radio base station 201 is installed in a registered installation location, and in step S1015, starts operation of the radio base station 201 accommodated in the network device 100.

Thereafter, if the user moves the radio base station 201 to a coverage area of the relay network 402 in step S1020, the radio base station 201 in step S1021 transmits an installation signal including identification information on the radio base station 201 to the information transfer device 502 to which the radio base station 201 is connected.

Here, the identification information on the radio base station 201 is managed only by the information transfer device 201 and not by the information transfer device 202. Thus in step S1022, the information transfer device 202 discards the received installation signal without transferring it to the network device 100.

As a result, the radio base station 201 is unable to start operation under control of the information transfer device 501 at the location to which the radio base station is moved.

To move the radio base station 201, the user is required to notify the mobile telecommunications operator of the installation location (location information) to which the radio base station 201 is moved, to thereby update the content of the radio base station information manager 23 of the network device 100 and the radio base station information manager 12 of the information transfer device 502.

(Advantageous Effects of Mobile Communication System According to First Embodiment of Present Invention)

The mobile communication system according to the first embodiment of the present invention enables detection of unauthorized moving of the radio base station 201 which the mobile telecommunications operator is not notified of, without causing a home radio base station to implement a GPS function. This is made possible by configuring the information transfer device 502 so as to detect the unauthorized moving of the radio base station 201 which the mobile telecommunications operator is not notified of and to not allow the moving, the detection being made when the information transfer device 502 receives an installation signal from the radio base station 201 whose installation location is not registered normally.

First Modified Example

Although the above embodiment is described by citing a W-CDMA mobile communication system as an example, the present invention is not limited to this mobile communication system, and is also applicable to an LTE (long term evolution) mobile communication system, for example.

In this case, functions of a radio controller are provided to a radio base station eNB or an exchange station MME. In other words, in this first modified example, the exchange MME is configured to serve as the above network device 100.

Second Modified Example

Figure 6:
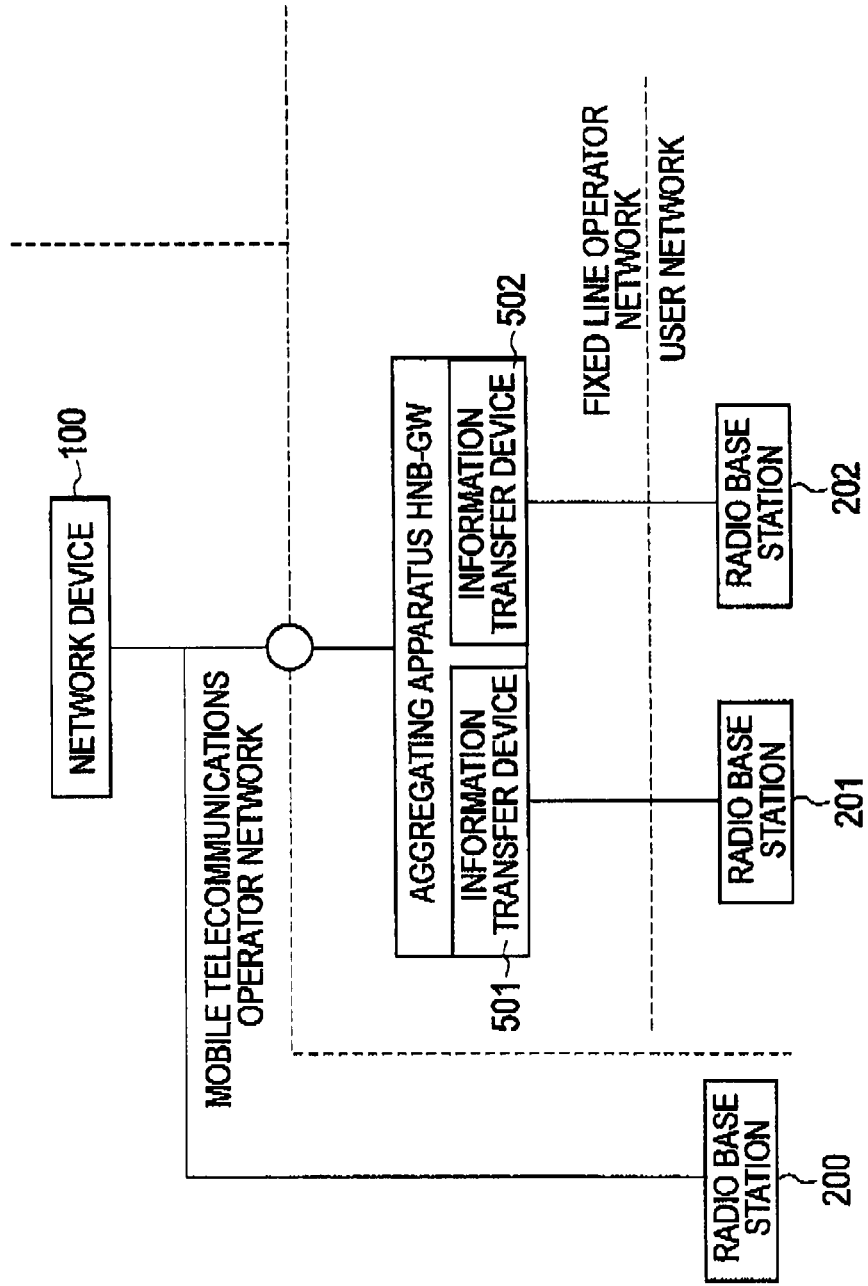
FIG. 6 is an overall configuration diagram of a mobile communication system according to a second modified example of the present invention.

As shown in FIG. 6, a mobile communication system according to the second modified example of the present invention includes a concentrator HNB-GW for accommodating radio base stations 201, 202.

Here, information transfer devices 501, 502 according to the aforementioned first embodiment may be provided inside the concentrator HNB-GW as shown in FIG. 6.

Note that the mobile communication system according to the second modified example of the present invention may either be a W-CDMA mobile communication system or an LTE mobile communication system.

Incidentally, the operation of the above-mentioned radio base stations 200, 201, the network device 100 and the information transfer device 501, 502 may be implemented by means of hardware, a software module executed by a processor, or a combination of both.

The software module may be provided in a storage medium in any format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Moreover, the storage medium may be integrated into the processor. Additionally, the storage medium and the processor may be provided in an ASIC. The ASIC may be provided in the radio base stations 200, 201, the network device 100 and the information transfer device 501, 502. Alternatively, the storage medium and the processor may be provided in the radio base stations 200, 201, the network device 100 and the information transfer device 501, 502 as a discrete component.

Hereinabove, the present invention has been described in detail using the above embodiments; however, it is apparent to those skilled in the art that the present invention is not limited to the embodiments described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising:
   step A of notifying an information transfer device of identification information on a radio base station by a network device, the information transfer device corresponding to an inputted installation location of the radio base station;
   step B of managing, by the information transfer device, the notified identification information on the radio base station;
   step C of transmitting, when the radio base station is installed or moved, an installation signal from the radio base station to an information transfer device to which the radio base station is connected;
   step D of transferring the installation signal to the network device by the information transfer device to which the radio base station is connected, if the information transfer device manages the identification information on the radio base station included in the received installation signal; and
   step E of discarding the installation signal without transferring the installation signal to the network device by the information transfer device to which the radio base station is connected, if the information transfer device does not manage the identification information on the radio base station included in the received installation signal,
   wherein in the step E, the information transfer device to which the radio base station is connected instructs the radio base station to notify the network device of an installation location of the radio base station, if the information transfer device does not manage the identification information on the radio base station included in the received installation signal.

2. A mobile communication system comprising:
   a network device; and
   a plurality of information transfer devices, wherein:
   the network device is configured to notify one of the information transfer devices of identification information on a radio base station, the one information transfer device corresponding to an inputted installation location of the radio base station;
   each of the information transfer devices is configured to manage the notified identification information on the radio base station;
   in a case where the radio base station transmits, at the time of installation or moving, an installation signal to an information transfer device to which the radio base station is connected, the information transfer device to which the radio base station is connected is configured to transfer the installation signal to the network device if the identification information on the radio base station included in the received installation signal is managed by the information transfer device; and
   in a case where the radio base station transmits, at the time of installation or moving, an installation signal to an information transfer device to which the radio base station is connected, the information transfer device to which the radio base station is connected is configured to discard the installation signal without transferring the installation signal to the network device if the identification information on the radio base station included in the received installation signal is not managed by the information transfer device,
   wherein the information transfer device to which the radio base station is connected instructs the radio base station to notify the network device of an installation location of the radio base station, if the information transfer device does not manage the identification information on the radio base station included in the received installation signal.

3. An information transfer device connected to a network device, comprising:
  a managing unit configured to manage identification information on a radio base station notified by the network device; and
  a transfer unit configured to transfer, to the network device, an installation signal transmitted by a radio base station at the time of installation or moving, if the identification information on the radio base station included in the installation signal is managed, wherein
  the transfer unit is configured to discard an installation signal transmitted by the radio base station at the time of installation or moving, without transferring the installation signal to the network device, if identification information on a radio base station included in the installation signal is not managed,
  wherein the transfer unit instructs the radio base station to notify the network device of an installation location of the radio base station if the identification information on the radio base station included in the installation signal is not managed.

* * * * *